United States Patent
Hoffman et al.

(10) Patent No.: US 9,407,352 B1
(45) Date of Patent: Aug. 2, 2016

(54) DUAL-SATELLITE EMERGENCY LOCATOR BEACON AND METHOD FOR REGISTERING, PROGRAMMING AND UPDATING EMERGENCY LOCATOR BEACON OVER THE AIR

(71) Applicants: Christopher Paul Hoffman, Fareham (GB); William Cox, Sunrise, FL (US); Thomas J. Pack, Boca Raton, FL (US)

(72) Inventors: Christopher Paul Hoffman, Fareham (GB); William Cox, Sunrise, FL (US); Thomas J. Pack, Boca Raton, FL (US)

(73) Assignee: ACR ELECTRONICS, INC., Fort Lauderdale, FL (US)

( * ) Notice: Subject to any disclaimer, the term of this patent is extended or adjusted under 35 U.S.C. 154(b) by 0 days.

(21) Appl. No.: 14/709,966

(22) Filed: May 12, 2015

Related U.S. Application Data

(63) Continuation of application No. 13/772,780, filed on Feb. 21, 2013, now Pat. No. 9,031,497.

(60) Provisional application No. 61/601,124, filed on Feb. 21, 2012, provisional application No. 61/601,139, filed on Feb. 21, 2012.

(51) Int. Cl.
*H04B 7/185* (2006.01)
*G01S 19/17* (2010.01)

(52) U.S. Cl.
CPC ........ *H04B 7/18519* (2013.01); *H04B 7/18532* (2013.01); *G01S 19/17* (2013.01)

(58) Field of Classification Search
CPC ........... G01S 19/17; G01S 19/48; G01S 1/68; G01S 5/0231
USPC .......... 455/12.1, 404.1, 404.2, 403, 427, 428, 455/445, 422.1, 500, 517, 55, 0.1, 13.1, 455/522, 414.1–414.4, 423–425, 67.11; 342/357.31, 385, 352, 357.22, 357.39; 340/539.13, 7.5

See application file for complete search history.

(56) References Cited

U.S. PATENT DOCUMENTS

| | | |
|---|---|---|
| 5,497,149 A | 3/1996 | Fast |
| 5,519,403 A | 5/1996 | Bickley et al. |
| 5,914,675 A | 6/1999 | Tognazzini |

(Continued)

FOREIGN PATENT DOCUMENTS

WO WO 2008121612 A1 * 10/2008 .............. G01S 19/17

OTHER PUBLICATIONS

Todd Hara, ORBCOMM PCS Available Now!, Military Communications Conference, 1995. MILCOM '95, Conference Record, IEEE, 1995, pp. 874-878, vol. 2, IEEE, USA.

(Continued)

*Primary Examiner* — Keith Ferguson
(74) *Attorney, Agent, or Firm* — Malin Haley DiMaggio & Bowen, P.A.

(57) ABSTRACT

A dual-satellite emergency locator beacon and method for programming and updating such emergency locator beacons over the air. The system uses a second commercial satellite as the carrier for the data back to the beacon together with the means of coupling these parts together. The system can be manually updated or can be part of a registration system that gets automatically updated. In a second embodiment a method and apparatus for implementing emergency locator beacon registration is provided. The system provides data concerning the user into a backend service which can be utilized to provide all necessary information needed to register the emergency beacon.

10 Claims, 4 Drawing Sheets

(56) References Cited

U.S. PATENT DOCUMENTS

| | | |
|---|---|---|
| 5,987,377 A | 11/1999 | Westerlage et al. |
| 6,085,090 A * | 7/2000 | Yee .................... G01S 5/0027 342/450 |
| 6,285,281 B1 | 9/2001 | Gatto |
| 6,771,163 B2 | 8/2004 | Linnett et al. |
| 7,215,282 B2 | 5/2007 | Boling et al. |
| 7,675,423 B2 | 3/2010 | Boling et al. |
| 7,830,305 B2 | 11/2010 | Boling et al. |
| 7,991,380 B2 | 8/2011 | Collins et al. |
| 8,018,332 B2 | 9/2011 | Boling et al. |
| 8,098,190 B2 | 1/2012 | Bishop et al. |
| 2004/0111195 A1 | 6/2004 | Vries et al. |
| 2006/0200842 A1 | 9/2006 | Chapman et al. |
| 2007/0057798 A1 | 3/2007 | Li et al. |
| 2012/0098699 A1* | 4/2012 | Calmettes ............... G01S 19/46 342/357.25 |

OTHER PUBLICATIONS

Motorola, Inc., Satellite Series 9505 Portable Telephone User's Guide, 1999, Motorola, Inc., USA.

* cited by examiner

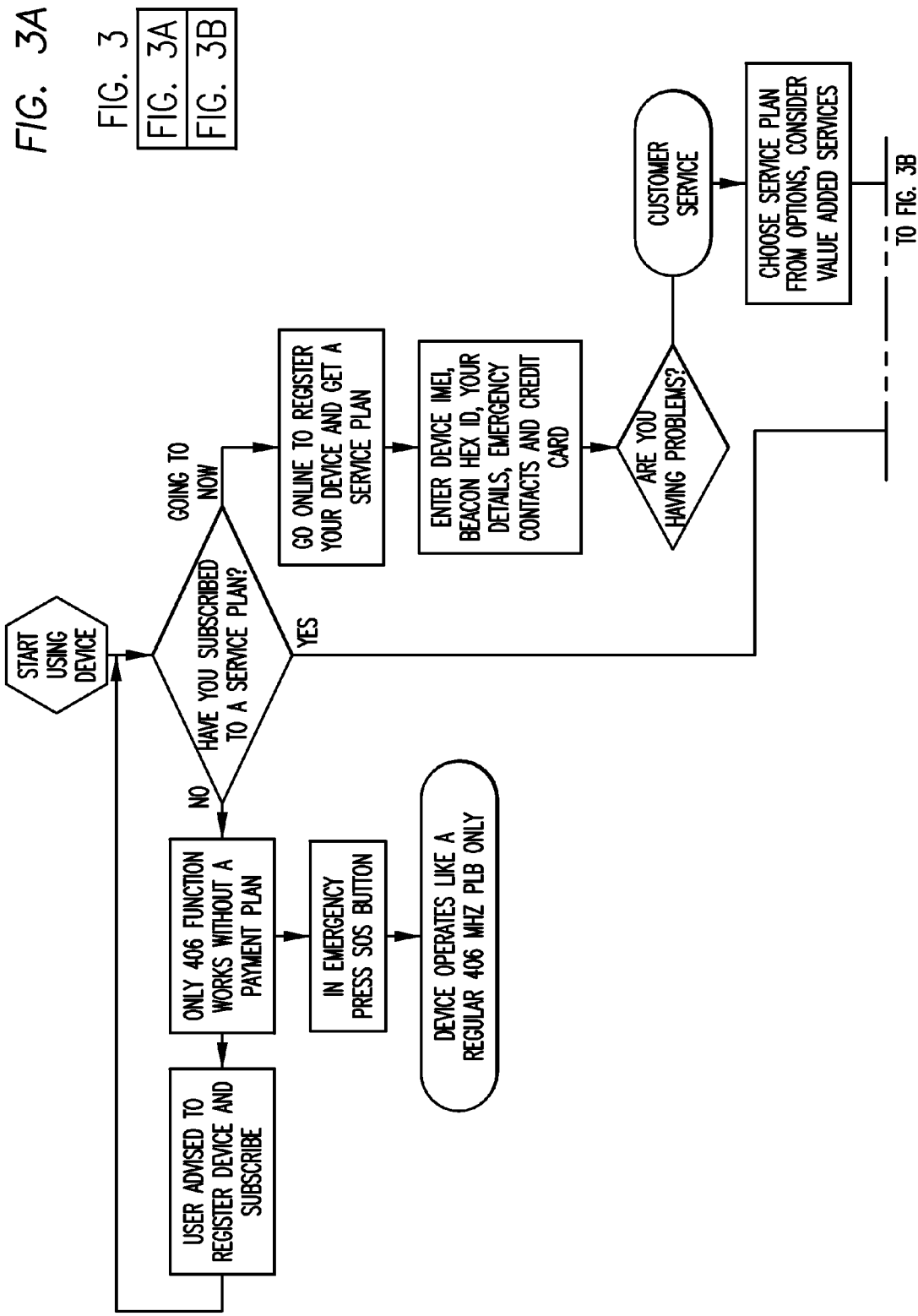

DUAL-SATELLITE EMERGENCY LOCATOR BEACON AND METHOD FOR REGISTERING, PROGRAMMING AND UPDATING EMERGENCY LOCATOR BEACON OVER THE AIR

CROSS REFERENCE TO RELATED APPLICATIONS

This application is a continuation of U.S. patent application Ser. No. 13/772,780 filed on Feb. 21, 2013, which claims priority to U.S. Provisional Patent Application No. 61/601,124 filed on Feb. 21, 2012 and U.S. Provisional Patent Application No. 61/601,139 filed on Feb. 21, 2012.

BACKGROUND OF THE INVENTION

1. Field of the Invention

The present invention relates generally to emergency communication devices and more specifically to an apparatus for emergency communications using dual satellite communications systems and a related method for registering, programming, and updating these emergency locator beacons over the air.

2. Description of Related Art

The Cospas-Sarsat international satellite system has been operational for many years and is well known. Its sole purpose is to provide emergency distress alerting capability from an aircraft, vessel or individual in distress to relevant emergency services, via a one way satellite communications network. This system employs three types of emergency locator beacons known as Emergency Locator Transmitters (ELTs), Emergency Position Indicating Radio Beacons (EPIRBs) and Personal Locator Beacons (PLBs) all operating in the 406.0 to 406.1 MHz frequency band. The system is unique in that it is truly global and is run by various governments for the benefit of all and sends emergency distress alerts directly to the relevant government authority responsible for rescue efforts (e.g. US Coastguard) around the world. The Cospas-Sarsat system provides a one way communications link between a beacon and one or more Cospas-Sarsat satellites. The Cospas-Sarsat satellites are in communication with one or more dispatchers who are responsible for routing a distress signal from a beacon to the appropriate first responders who carry out the rescue efforts. Specifically, the Cospas-Sarsat satellites receive a distress signal and route it to one or more receiving and processing stations called LUTs, or local user terminals. The LUTs generate distress alert data which is then communicated to a Mission Control Center (MCC) whereby the MCC then routes instructions and information to localized Rescue Coordination Centers (RCC). The RCCs are then responsible for facilitating the coordination of the rescue efforts. While the Cospas-Sarsat system is effective, it is limited in that it only provides for one way communication which can cause uneasiness for the person(s) in distress as well as for the responders.

More recently, commercial satellite communication systems utilizing both one way (remote user to satellite ground station only (e.g. Globalstar SPOT) or satellite ground station to remote user only (e.g. Sirius XM radio)) and two way communications have become more common and have started to be used for both emergency distress alerting and general day to day communications. These satellite communication systems are particularly useful in locations where cellular telephone antennas cannot be placed and/or where cellular telephone reception is low or non-existent. Satellite communications systems have been tailored for emergency communications through the adoption and use of Satellite Emergency Notification Devices (SENDs). Globalstar SPOT is one example of a one way version of such a device and the DeLorme InReach device is one example of a two way version of such a device. Typically, a satellite communication system operates by creating a one-way or two-way communications link between a satellite telephone or SEND and a commercial communications satellite. The commercial communications satellite may comprise the Iridium satellite system already established in the art. The communications satellite is further in communication with a satellite gateway whereby the gateway is in communication with one or more computer servers. The computer servers typically have connections to the internet, cellular telephone systems, or standard land-line telephone systems thereby allowing the satellite phone or SEND user to communicate with a plurality of other devices by way of a plurality of communications systems. In some instances, the computer servers may be in communication with a particularized commercial emergency response call center that carries out specific emergency rescue operations should the satellite phone or SEND use request them or press an "emergency" key on his device.

There are several advantages of SEND devices compared to 406 MHz beacons in that they permit communications other than pure emergency distress alerting and thus can be used on a regular basis to remain in communications when outside of an area of cellular phone coverage. In addition, SENDs can be used to track and report on the location of the remote person as well through the use of internal GPS transmitter/receivers typically found in SENDs. In addition, because SENDs and satellite telephones permit two-way communications, in an emergency situation some of the satellite devices can provide to the user additional information on the emergency and rescue efforts and some can even permit communication with the person in distress by voice, data, or text message.

However, SEND devices also suffer from some disadvantages compared to 406 MHz beacons in that they currently have to forward distress alerts to a commercial emergency call center (e.g. a 911 call center) and this call center then has to communicate with the relevant emergency services. It is then difficult for the relevant emergency services to communicate backwards and forwards with the person in distress because the system is not cohesively and centrally established for emergency and rescue efforts.

Further still, while both the 406 MHz beacons and SEND systems have redundancy built into it to allow for outages in parts of the system, each is still dependent upon a single communications system that may break down or become unreliable in what can often be a life threatening situation. Accordingly, one aspect of the present invention addresses the advantages and disadvantages of each system and combines them to provide a robust, redundant, and significant more effective emergency locator beacon.

In addition to addressing the general problems associated with the Cospas-Sarsat and commercial satellite communication systems, the present invention also addresses the problems currently associated with registering, programming, and updating emergency locator beacons. Currently, Cospas-Sarsat beacons transmit a digital message containing, amongst other things, the unique identity of the beacon. The format of this digital message is defined in international standards and is comprised of a number of different data fields, each of which contains different data depending on the particular message format of which there are a number to address differing administrations and equipment requirements. These unique identity data fields include, amongst others, a Country Code field, a Beacon Serial Number field, a Beacon MMSI field (used to indicate the number of the vessel upon which an EPIRB is fitted), a Beacon Aircraft Tail Number field (used to indicate the aircraft on which an ELT is installed) and the like. The information in these data fields is used by the emergency services to assist them in a rescue mission, to help to eliminate false alerts where beacons are activated by mistake and to direct the emergency services to the country where the beacon is registered and thus where further information on the beacon or the craft on which it is fitted might be obtained.

Thus, it is critical that the data in the beacon is up to date and relevant to the country of registration of the beacon. However, if a beacon owner moves from one country to another, or moves their beacon from one aircraft or vessel to another, it is necessary to reprogram the beacon to update the information in these data fields. Unfortunately, as noted above, the Cospas-Sarsat System is a one way system only (i.e. there is no return link to the beacon) and therefore, currently, reprogramming activity needs to be carried out by physical reprogramming of the beacon. That is, the beacon has to be taken to a place where it can be connected up to suitable reprogramming equipment such as a computer terminal or other means. This process is both time consuming and expensive to carry out and thus quite often as a result this critical information in the beacons is not updated, which can hamper a rescue mission in an emergency or waste precious rescue services time and money following up on false alerts.

Therefore a system whereby it would be possible to not only update this information over the air but also to update it automatically in some circumstances would be of great benefit to all concerned. Accordingly, the present invention addresses these problems by defining a way to use a second commercial satellite system as the carrier for the programming data back to the beacon.

Further still, as described above, Emergency Beacons transmit a digital message containing amongst other things the identity of the beacon. This message contains a number of data fields which include amongst others a Country Code field and a Beacon Serial Number field. The identity data fields however do not contain all of the details required by the emergency services, due in part to restrictions in the amount of data that can be transmitted. Thus details such as the name of the owner of the emergency beacon, or their contact details (e.g. their address and telephone number), or the details of a third party (e.g. a family member) who may be contacted in the event of an emergency are not included in the transmitted data.

Many countries require the owners of emergency beacons to register them with an appropriate body (e.g. the coastguard) such that the emergency services can obtain access to this additional data in the event that an emergency beacon is turned on and they need to contact someone about it. Each emergency beacon in the world is programmed with an individual unique identity which enables it to be singled out from all other emergency beacons. This unique identity is usually printed on both the casing of the emergency beacon and provided in paperwork supplied with the emergency beacon. Currently, the registration process generally is comprised of the new owner of the emergency beacon sending this unique beacon identity together with requested additional details, such as those mentioned above, to the appropriate national registration body. This process can generally be done by filling in this information on a form either on paper or electronically and then either mailing the form via the postal service or submitting it electronically over the internet. However, there is no way to automate this process and many owners of emergency beacons never bother to register them, which causes problems for the emergency services in the event that one of these un-registered beacons is turned on. Further, if there are changes in ownership or the owner wishes to update certain information, the process can become difficult and time consuming because there is not centralized method for updating same. Accordingly, the present invention addresses this problem and provides a method of automatic registration to relieve the emergency beacon owner from having to do this task; it also provides a much higher registration rate for emergency beacons and reduces the risk of errors creeping into the registration data.

SUMMARY OF THE INVENTION

The present invention discloses a dual-satellite emergency locator beacon and method for registering, programming and updating emergency locator beacon over the air. In some embodiments, the emergency communications beacon comprises a first satellite communications transmitter, a second satellite communications transmitter, a first microprocessor and a second microprocessor; wherein the first microprocessor controls the first transmitter and the second microprocessor controls the second transmitter. The first transmitter is configured to communicate over a first satellite communications system, such as the Cospas-Sarsat 406 MHz system, and the second transmitter is configured to communicate over a second satellite communications system, such as a commercial satellite communications system. The first and second microprocessors of the beacon are interconnected to permit data transfer therebetween.

In some embodiments, the second microprocessor is configured to receive data from the second satellite communications systems, over the second transmitter, and transfer the data to the first microprocessor. This allows programming of the first microprocessor by way of data received over the second satellite communications system. Further, the first microprocessor is configured to transmit and receive data from the second satellite communications systems by way of the second microprocessor. This allows for the first transmitter of the beacon, in some cases the 406 MHz transmitter, to identify itself over the second satellite communications system, the SEND commercial satellite system.

Further still, in some embodiments, the first and second satellite communications systems are in bi-directional communication by way of an interface system wherein the first satellite communications system can transmit data to the beacon over the second satellite communications system by way of the interface system. The beacon may further include a global positioning system receiver which is interfaced with either the first or second microprocessors (or both) for transmission of location information in accordance with the above.

The present invention also discloses method for programming an emergency communications beacon, comprising providing the emergency beacon, wherein the beacon includes a first satellite communications transmitter, a second satellite communications transmitter, a first microprocessor and a second microprocessor, wherein the first microprocessor controls the first transmitter and the second microprocessor controls said second transmitter; establishing a communications link between the first transmitter and a first satellite communications system; establishing a communications link between the second transmitter and a second satellite communications link; establishing a data transfer link between the first microprocessor and the second microprocessor; receiving on the second transmitter from the second satellite communications link, programming data; processing the programming data from the second transmitter on the second microprocessor; transferring the programming data from the second microprocessor to the first microprocessor; and processing the programming data on the first microprocessor to program the beacon.

DESCRIPTION OF THE DRAWINGS

FIGS. 3A and 3B display a flow diagram of one aspect of the present invention.

PREFERRED EMBODIMENTS OF THE INVENTION

Combined 406-SEND Beacon and Dual-Satellite Communications

Figure 1:
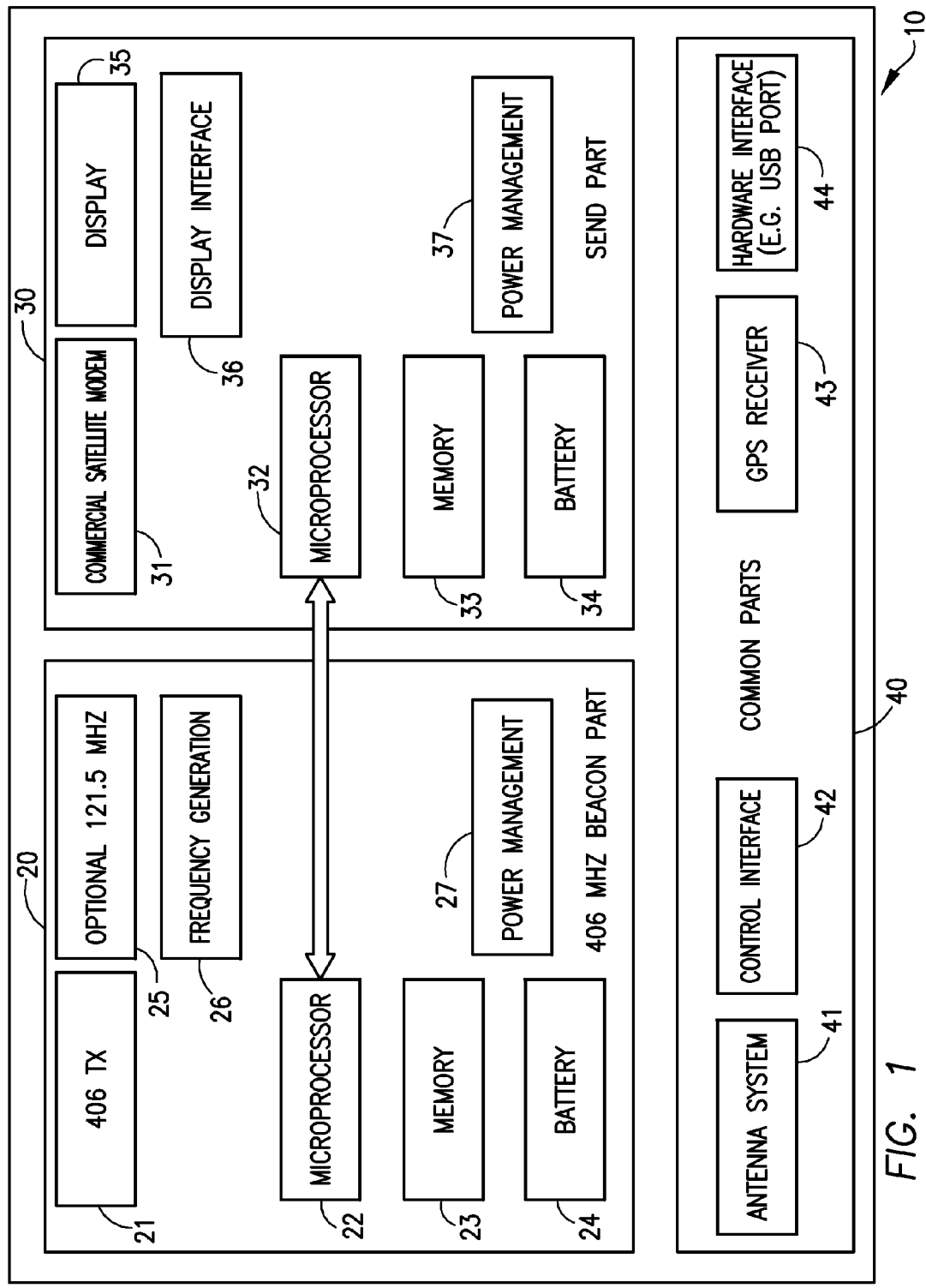
FIG. 1 is a block diagram of a one embodiment of the communication device of the present invention.

With reference to FIG. 1, shown is a block diagram of one embodiment of the communication device of the present invention configured as dual-satellite emergency locator beacon 10. Beacon 10 comprises three primary sections including a 406-MHz section 20, a SEND section 30, and a shared section 40. The 406-MHz section 20 is generally understood as the portion of beacon 10 that is configured to communicate over a Cospas-Sarsat satellite communications network that operates typically on the 406 MHz frequency. The SEND section 30 is a portion of device that is configured to communication over a commercial satellite communication system such as a commercial satellite telephone network like the Iridium system. Other satellite communication systems are equally suitable, however. The shared section 40 is the portion of the device that includes shared hardware and software components or other hardware and software components that allow beacon 10 to properly operate. It is appreciated that beacon 10 may also include a housing, keypad, display, indicator lights, and other components although these physical components are not limiting here.

The 406 MHz section 20 includes a 406 transmitter 21 (first transmitter), a microprocessor 22, a memory bank 23, a battery 24, an optional 121.5 MHz transmitter 25 (homing transmitter), a frequency generation device 26, and a power management feature 27. In some embodiments, the microprocessor 22 is configured to operate each of the components of the 406 MHz section 20. Memory bank 23 may comprise read-only memory, random-access memory, and combinations thereof. The battery 24 may comprise a general power source such as a reusable or rechargeable battery or an AC adaptor or other power source known in the art. The frequency generation device 26 is in communication with the transmitters 21 and 25 and is configured to allow the device to operate over the Cospas-Sarsat communications system or similar system. The signals to be transmitted are processed by microprocessor 21 which is in communication with the other components and serves as the "brain" or logic system for the transmitters 21 and 25.

The SEND section 30 includes a commercial satellite modem 31 (second transmitter), a microprocessor 32, memory 33, a battery 34, a display 35, a display interface 36, and power management 37. The microprocessor 32 is in communication with the various components of the SEND section 30 and is configured with software and logic to allow the beacon 10 to communicate over a commercial satellite communications system. The modem 31 handles the primary transmission and receiving of signals and is configured to connect to and operate over a commercial satellite system. The display is utilized to view a graphical user interface which allows the user to operate the device. The display interface 36 is connected between the microprocessor 32 and display 35 and processes signals and instructions sent from the microprocessor 32 to the display 35. The memory 33 and battery 34 are not limited as to a specific configuration as discussed above.

The common section 40 includes an antenna system 41, a control interface 42, a GPS receiver 43, and a hardware interface 44. The antenna system 41 is configured to boost and amplify the signals sent and received from the transmitters 21 and 25 and the modem 31 of the beacon 10. The control interface 42 may comprise hardware or software buttons or other input devices that permit the user to interact and control the beacon 10. The GPS receiver 43 may comprise a global positioning system receiver that permits the device to communicate with a plurality of GPS satellites in order for the location of the beacon 10 to be determined. The GPS information may be processed through the device and sent over a commercial satellite system by way of commercial satellite modem 31 or through the 406 transmitter 21. Accordingly, the GPS receiver 43 may be in communication with either microprocessors 22 or 23, or both. The hardware interface 44 may comprise a USB port, serial port, parallel port, Bluetooth communication port, or similar port by which the beacon 10 can be receive instructions, updates, programming, and the like. The beacon 10, in some embodiments, is configured to upload and download information to and from the hardware interface 44.

The microprocessors 22 and 32 of the respective 406 and SEND sections are configured to be interfaced and in communication such that instructions can be passed between the two. This allows the SEND section 30 to transmit, receive, and process data which can then be sent over to the 406 section 20. Conversely, the 406 section 20 can transmit, receive, and process data which can then be sent over to the SEND section 30. In some embodiments, the SEND microprocessor 32 can send and retrieve identity and registration data to and from the 406 microprocessor 22 as further described below. In some embodiments, it is appreciated that the microprocessors 22 and 32 may be combined in a single dual-purpose microprocessor having the desired functionality disclosed herein.

Figure 2:
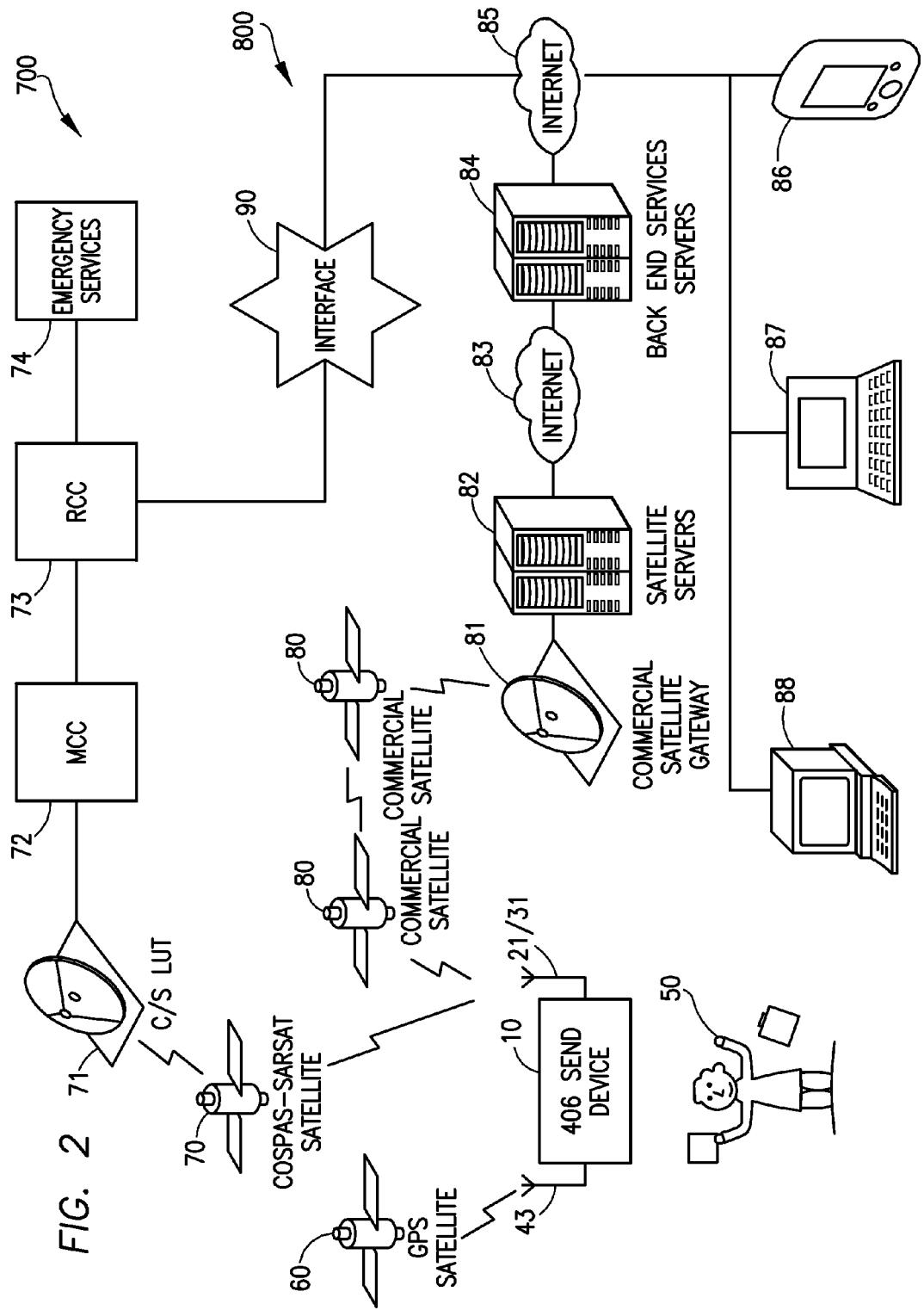
FIG. 2 is a schematic diagram of the one embodiment of the communication system of the present invention.

FIG. 2 is a schematic diagram demonstrating how the beacon 10 interacts with two satellite communications systems, namely the Cospas-Sarsat system and a commercial satellite communications system, such as a commercial satellite telephone system. Shown is a user 50 who operates beacon 10. User 50 may be a person under distress or may simply be a person desirous of communicating via his beacon 10. Beacon 10 includes one or more transmitter/receivers 21/31 and 43. In some embodiments, receiver 43 is a global positioning system (GPS) receiver that is capable of receiving location information to one or more GPS satellite system 60. In some embodiments, transmitter/receiver 21/31 is a dual-purpose transmitter/receiver configured to simultaneously and/or selectively communicate over both a 406 MHz Cospas-Sarsat system and a commercial satellite communications system as described in connection with FIG. 1 above. In other embodiments, the transmitters may be discrete, defining a first transmitter 21 and a second transmitter 31, wherein the first transmitter 21 is configured as the 406 MHz transmitter 21 and the second transmitter 31 is configured as a commercial satellite modem 31, as described above. It is appreciated that where the Cospas-Sarsat system is only a one-way communication system, the transmitter/receiver 21/31 is configured for that one-way communication. Further, transmitter/receiver 21/31 is configured for two-way communication by way of a commercial satellite system. As mentioned, in some cases, the transmitter receiver 21/31 comprises discrete components, i.e. a first transmitter 21 (406 transmitter) and a second transmitter 31 (commercial satellite modem).

Beacon 10 is configured to selectively communicate by way of transmitter/receiver 21/31 to one or more Cospas-Sarsat satellites systems 70 and one or more commercial satellites systems 80. Accordingly, in some embodiments, beacon 10 is in communication with Cospas-Sarsat satellite 70 which is in turn in communication with one or more local user terminals (LUT) 71. A user 50 may generate a 406 MHz distress signal on his beacon 10 which signal is then relayed first to the Cospas-Sarsat satellite 70 and then to the LUT 71. The LUT 71 is then capable of generating distress alert data which is then communicated to a Mission Control Center (MCC) 72 whereby the MCC 72 then routes instructions and information to one or more localized Rescue Coordination Centers (RCC) 73. The RCCs 73 are then responsible for facilitating the coordination of the rescue efforts and, in some embodiments, are in communication with local emergency services 74 who carry out the actual rescue.

On the other hand, in some embodiments, the beacon 10 is in communication with one or more commercial satellites 80 which are tasked with relaying various satellite telephone communications. In some embodiments, the one or more commercial satellites 80 are in communication with a commercial satellite gateway 81 which functions as a relay point between the ground services (discussed herein) and the satellites 80. The "ground services" comprise a series of interconnected computer systems including one or more satellite servers 82 which may be in communication with the Internet 83 and further in communication with one or more back end services servers 84 which may also be in communication with the Internet 85. The back end services servers 84 are capable of communicating with a plurality of devices which allow two-way communication between those devices and the beacon 10 in the field. In some embodiments, these devices include: a cellular telephone 86 for voice, data, and text services; a personal computing device 87 such as a laptop, desktop, or mobile device for voice, data, and text (e-mail) services; and a 406-SEND-specific user interface device 88 for voice, data, and text services. The foregoing commercial satellite configuration allows for the establishment of a bi-directional communications link between one or more beacons 10 and one or more other devices such as the aforementioned personal computer, mobile device, cellular telephone, or 406-SEND interface.

To further enhance the reliability and usefulness of the system and method of the present invention, an interface 90 is provided to establish a communications link between the back end services server 84 of the commercial satellite system and the one or more RCCs 73. In some embodiments, the back end services server 84 utilizes its internet connection 85 to communicate with RCC 73 over interface 90. The interface 90 is a specialized and critical component which allows the Cospas-Sarsat system to communicate directly with the commercial satellite system in order to provide a more robust, complete, and integrated set of communications and emergency services. In some embodiments, interface 90 may comprise an automated communications interface that is established as a joint effort by both the Cospas-Sarsat system and the commercial satellite system. In other embodiments, interface 90 may comprise a discrete third-party service provider whose primary function is to facilitate communications between the Cospas-Sarsat system and the commercial satellite system. Accordingly, interface 90 may comprise either a passive communications link or an active communications link between the Cospas-Sarsat system and the commercial satellite (SEND) system. In some embodiments, the "active" link comprises a service provider employing one or more computer networks to provide a robust set of communications services. In some embodiments, interface 90 functions as an interface to expand the one-way communications capabilities of the already-established Cospas-Sarsat system to allow for two-way communication thereof by way of the commercial satellite (SEND) system.

The beacon 10 and the system of the present invention provides several advantages over the prior art. Primarily, the dual-band (Cospas-Sarsat AND commercial satellite) beacon 10 offers full redundancy by allowing a user 50 to send a distress alert over both systems in parallel. The interface 90 allows for both systems to work in concert without overlap of resources or mis-communication. In some embodiments, the system passes 406 MHz distress alerts to the government-run Rescue Coordination Centers (RCCs) and permits via a direct interface 90 the SEND data to also be transmitted to that same RCC, together with the 406-SEND device's 20 identity to allow the RCC or others to reconcile the two alerts as one.

Moreover, the configuration also allows the beacon 10 to be registered and receive programming and updates over the air in a much more efficient and streamlined manner. To wit, presently because the Cospas-Sarsat satellite system is only a one-way communications system, i.e. beacon to satellite, there is no mechanism for the Cospas-Sarsat operators to communicate registration, programming, and update data to the beacon 10. However, the present invention solves this problem by incorporating the commercial satellite communications system and implementing interface 90 which allows for cross-communication between the beacon 10 and both the satellite systems. This allows the beacon 10 to receive programming and updates and send registration information by way of the commercial satellite system but also allows the Cospas-Sarsat system to send and receive such information, also by way of the Cospas-Sarsat System. The interface 90 therefore effectively expands the existing Cospas-Sarsat system into a two-way communication system.

In accordance with this general framework, the present invention provides a plurality of methods of updating, programming and registering a beacon 10. Generally, in some embodiments, the present invention discloses a method for programming the emergency communications beacon 10, comprising providing the emergency beacon, wherein the beacon includes a first satellite communications transmitter 21, a second satellite communications transmitter 31, a first microprocessor 22 and a second microprocessor 32, wherein the first microprocessor 22 controls the first transmitter 21 and the second microprocessor 32 controls said second transmitter 31; establishing a communications link between the first transmitter 21 and a first satellite communications system 70; establishing a communications link between the second transmitter 31 and a second satellite communications system 80; establishing a data transfer link between the first microprocessor 22 and the second microprocessor 32; receiving on the second transmitter 31 from the second satellite communications system 80, programming data; processing the programming data from the second transmitter 31 on the second microprocessor 32; transferring the programming data from the second microprocessor 32 to the first microprocessor 21; and processing the programming data on the first microprocessor 22 to program the beacon. More specific embodiments are disclosed herein:

Manual Update Method

If identity data, software, or other aspect of the beacon 10 requires updating for some reason, then the user can utilize the dual-satellite functionality of the present invention to accomplish same. The beacon 10 establishes its connection with the commercial satellite system and can receive software updates and new identity information over the SEND aspect of the beacon 10. The interconnectivity of the microprocessors 22 and 32 on the beacon 10 allow update data to be transferred from the SEND section 30 to the 406 section 20 with ease. This is particularly useful when desiring to update the identity data of the 406 section 20 of the device, which would otherwise only be capable of being updated through a physical connection with a computer terminal Updated identity data can also be sent from the 406 section 20 to the SEND section 30 of the beacon 10 and then back over the commercial satellite system to the Back End Servers 84 and Interface 90 where the accuracy of the updated identity can be verified either automatically by the system or manually by the user or operators. Accordingly, the dual-satellite capability of beacon 10 and the interaction between the two sections 20 and 30 within the device allow for a substantial improvement in the manner and method of updating the beacon 10 as a whole, particularly with respect to the identity information of the 406 section 20 which is not presently updatable over-the-air.

Automatic Update Method

Figure 3B:
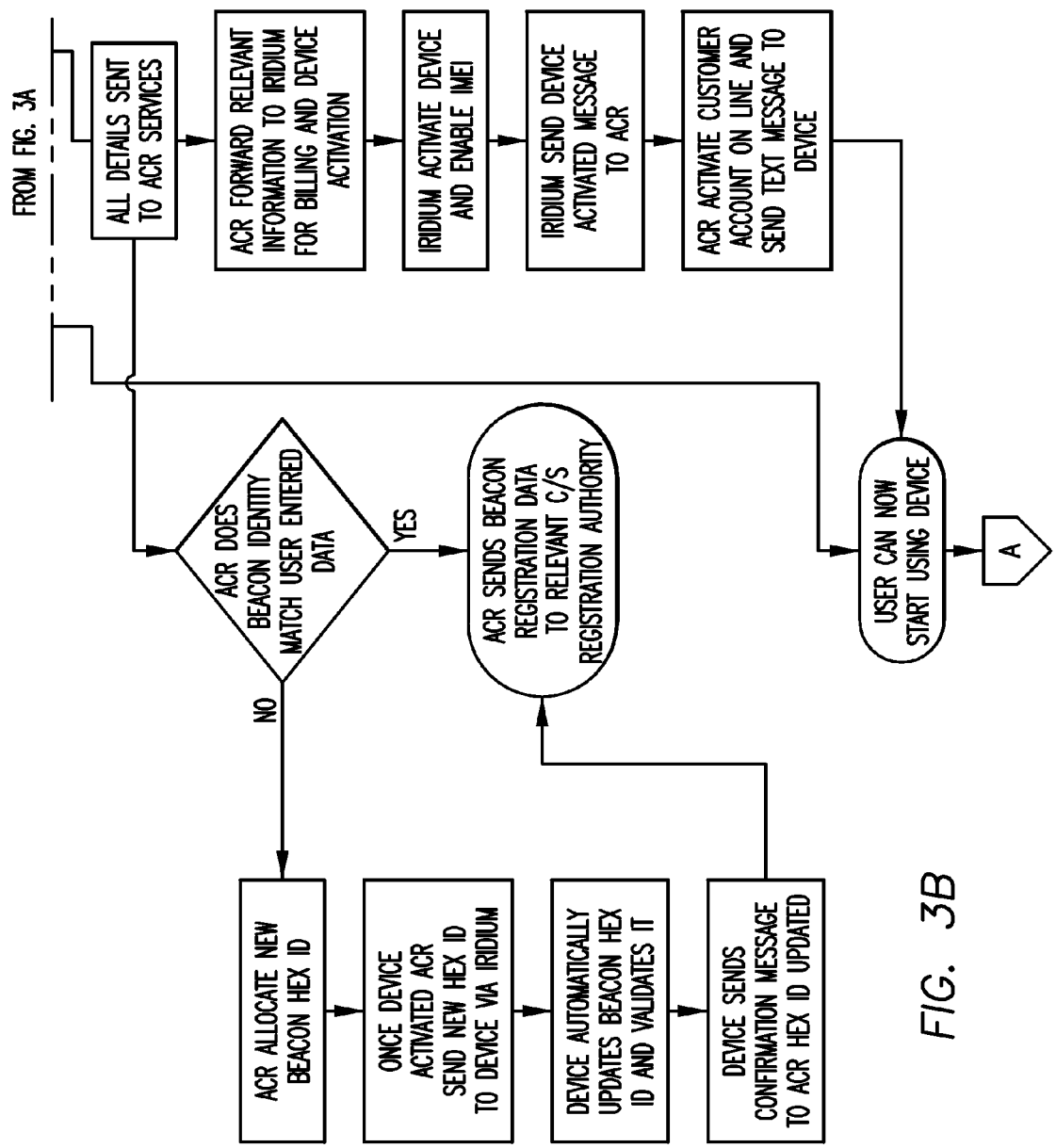

In some embodiments, the commercial satellite or SEND section 30 of the beacon 10 will require registration and/or periodic re-registration with the satellite system. To wit, in some embodiments, in order to receive commercial satellite communication services, users are required to provide the commercial satellite system with data about themselves (e.g. address, credit card details, emergency contacts, vessel or aircraft details etc). This data is used for a number of purposes (e.g. to enable collection of the fees for the commercial satellite service) but it is also available to assist in identity verification. In the present invention, in some embodiments, when the user enters the this data that the user is also required to enter the identity of the 406 MHz section 20 of the beacon 10 at the same time. This thus provides the commercial satellite system, at Back End Server 84, with all the necessary information needed to verify that the identity programmed into the beacon 10 is correct. In other words, the identity of the 406 MHz section of the beacon 10 can be obtained, updated, and verified through the SEND capabilities of the beacon 10. In other embodiments, if the identity of the 406 section 20 of the beacon 10 is found to be invalid for some reason (e.g. the person purchased the 406—SEND device in one country and then took it to another country where they resided and thus the Country Code field programmed into the emergency beacon would be incorrect) the system can automatically update the identity thereof by way of the commercial satellite system automatically without any interaction on the part of the user. Further, the system can verify that the identity has been successfully updated in a similar manner to that explained above for the Manual Updating Method. This procedure is explained in the flow chart shown in FIGS. 3A and 3B. The identity of the 406 section 20 of the beacon 10 is formatted as a hexadecimal identification number. The identification number is pulled from the 406 section 20 through to the SEND section 30 of the beacon 10 and is then sent to the back end servers 84 of the commercial satellite system. Interface 90, identified as "ACR" in FIG. 3B, can then conduct an analysis as to whether the identity information is correct. If the information is incorrect, a new hexadecimal identification number is generated and sent to the beacon 10 back over the commercial satellite system whereby the SEND section 30 of the beacon reads it and processes it over to the 406 section 20 of the beacon 10, updating same.

The instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. An emergency communications beacon, comprising:
    a first satellite communications transmitter, a second satellite communications transmitter, a first microprocessor and a second microprocessor;
    wherein said first microprocessor controls said first transmitter and said second microprocessor controls said second transmitter;
    wherein said first transmitter is configured to communicate over a Cospas-Sarsat satellite communications system and said second transmitter is configured to communicate over a commercial satellite communications system;
    wherein said first and second microprocessors are interconnected to permit data transfer therebetween;
    wherein said second microprocessor is connected to a display interface, said display interface is connected to a display, whereby said display interface processes signals and instructions sent from said second microprocessor to said display.

2. The beacon of claim 1, wherein said second microprocessor is configured to receive data from said commercial satellite communications system, over said second transmitter, and transfer said data to said first microprocessor.

3. The beacon of claim 1, wherein said first microprocessor is configured to transmit and receive data from said commercial satellite communications systems by way of said second microprocessor.

4. The beacon of claim 1, wherein said Cospas-Sarsat and said commercial satellite communications systems are in bi-directional communication by way of an interface system; and wherein said Cospas-Sarsat satellite communications system can transmit data to said beacon over said commercial satellite communications system by way of said interface system.

5. The beacon of claim 1, wherein said first transmitter comprises a Cospas-Sarsat transmitter and said second transmitter comprises Satellite Emergency Notification Device (SEND) transmitter.

6. The system of claim 1, wherein said beacon further includes a global positioning receiver.

7. An emergency communications beacon, comprising:
    a first satellite communications transmitter, a second satellite communications transmitter, and a microprocessor;
    wherein said microprocessor controls said first transmitter and said second transmitter and permits data transfer between said first and second transmitters;
    wherein said first transmitter is configured to communicate over a Cospas-Sarsat satellite communications system and said second transmitter is configured to communicate over a commercial satellite communications system; and
    wherein said microprocessor is connected to a display interface, said display interface is connected to a display, whereby said display interface processes signals and instructions sent from said microprocessor to said display.

8. The beacon of claim 7, wherein said Cospas-Sarsat and said commercial satellite communications systems are in bi-directional communication by way of an interface system; and wherein said Cospas-Sarsat satellite communications system can transmit data to said beacon over said commercial satellite communications system by way of said interface system.

9. The beacon of claim 8, wherein said first transmitter comprises a Cospas-Sarsat transmitter and said second transmitter comprises Satellite Emergency Notification Device (SEND) transmitter.

10. The system of claim 9, wherein said beacon further includes a global positioning receiver.

* * * * *